UNITED STATES PATENT OFFICE.

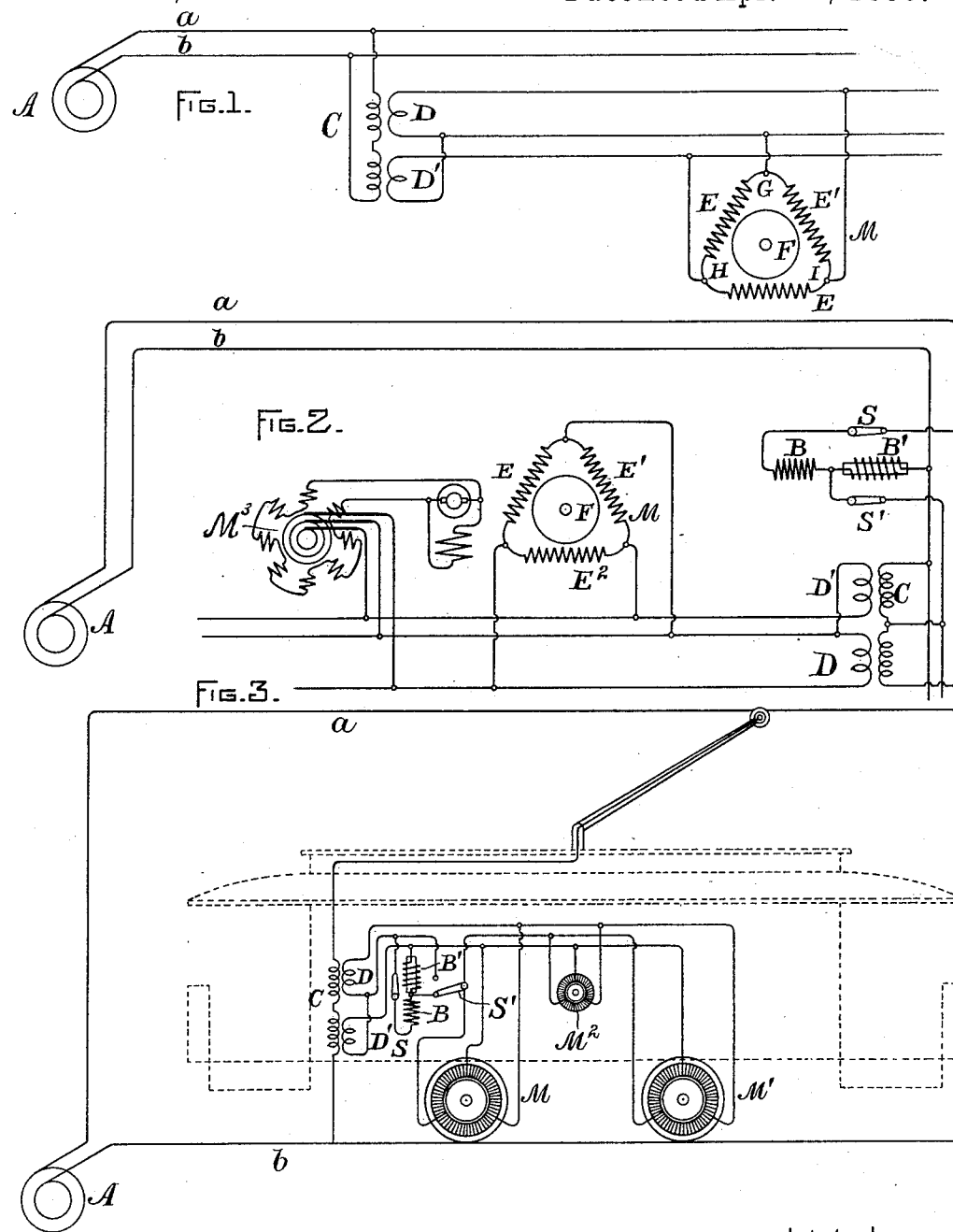

CHARLES P. STEINMETZ AND ERNST J. BERG, OF SCHENECTADY, NEW YORK, ASSIGNORS TO THE GENERAL ELECTRIC COMPANY, OF NEW YORK.

REGULATING ALTERNATING-CURRENT MOTORS.

SPECIFICATION forming part of Letters Patent No. 558,119, dated April 14, 1896.

Application filed December 26, 1895. Serial No. 573,293. (No model.)

*To all whom it may concern:*

Be it known that we, CHARLES P. STEINMETZ, a subject of the Emperor of Germany, and ERNST J. BERG, a subject of the King of Sweden and Norway, residing at Schenectady, in the county of Schenectady, State of New York, have invented certain new and useful Improvements in Regulating Alternating-Current Motors, (Case No. 317,) of which the following is a specification.

Our invention relates to the regulating of alternating-current motors, and particularly to those of the induction type.

The special class of apparatus which we design to regulate by the invention herein described is induction-motors running upon single-phase circuits; and to this end we employ multiphase motors of one type or another, preferably those of three-phase type; but they are so connected to the single-phase circuit as to run with much larger output and efficiency than by any other method of operation with which we are familiar, and they are also readily started and run up to speed by the devices which we have originated, and after attaining their speed the increased efficiency just referred to is obtained.

It is well known that an ordinary three-phase or two-phase (or in general any polyphase) motor may be connected to a single-phase circuit, and when so connected will, after it has been run up to synchronism, or approximately so, operate satisfactorily as a motor; but its output in this method of connection is limited. Ordinarily with a three-phase motor but two of the terminals of the inducing member or field are connected to line, and this employs, therefore, in producing the alternating field, only two of the sets of coils which make up the field-magnet of the motor. Thus the winding of the third coil is wasted. There is also no starting effect in such a motor, but it must be started mechanically before the load is put on. The output of motors run in this way is small compared to that which it is possible to obtain from them as multiphase motors.

By our invention we connect all three terminals of the inducing member to line, or, to speak more accurately, we connect them to three lines leading from transformer-secondaries, the primaries of two ordinary transformers being connected in series between the lines leading from the generator. The secondaries are similarly connected, but one of these is reversed, and from the point of junction of the two secondaries the third line is run. To the three lines thus disposed the terminals of the inducing member or field of the motor are connected. After the motor has been started with such an arrangement the single-phase electromotive forces are split by the motor, as more particularly described hereinafter, so that the motor operates approximately as a three-phase motor in the particular arrangement described, for which could be substituted, of course, arrangements adapted to act as two-phase motors, or other polyphase apparatus, as will be manifest to those skilled in the art.

The drawings accompanying this specification show diagrammatically embodiments of our invention, in which—

Figure 1 is a diagram showing a three-phase motor connected as just briefly described. Fig. 2 is a similar diagram showing the means which we have devised for starting the motor. Fig. 3 is a diagram illustrating the combination of apparatus by which single-phase electric railways may be operated by our invention.

A is a generator of single-phase alternating current. *a b* are the leads leading therefrom.

C shows the primaries of two transformers connected in series across the mains. D D' are the secondaries of these transformers, D' being shown in reversed relation, as already explained.

M is a three-phase motor, of which the inducing-coils are E E' E², F being its armature.

In Fig. 2 the same parts are similarly lettered; but in this figure we show the means for starting the motors. In the particular case illustrated this means is applied to the primaries of the transformer, and this would be the arrangement where three wires could be conveniently run, as in a mill or factory or other place, in which case a single-phase transmission might be employed and all of the motors would be supplied with starting-current from the means illustrated, which would, however, ordinarily be cut out after any one of the motors was started, as in accordance with well-known principles such motor would furnish an out-of-phase electromotive force adapted to start any of the others. The particular means which we show consists of a resistance B and a reactance or inductance B'. The third line (which might represent the teaser of the monocyclic system) is connected to a neutral point between the reactance and the resistance. Switches S S' are employed, by which the apparatus may be cut out after it has fulfilled its function of starting one or more of the motors. The principles upon which this part of our invention rests will not be further explained, inasmuch as they are illustrated and described in our pending application, Serial No. 562,037, filed September 10, 1895, and such further description is unnecessary. In the case of electric railways, however, a different method is desirable. One great cause of the present success of trolley-railways of various types is their simplicity of wiring, requiring only a single wire above each track, a single traveling contact, and making direct connection with the track or ground return. This has been an obstacle in the way of alternating-current railways, inasmuch as three-phase or other self-starting roads require a multiplicity of aerial conductors. By our invention we are, however, enabled, as will be apparent, to operate electric tram-cars upon a single-phase system, such cars, which are ordinarily not self-starting, being by the arrangements which we have pointed out readily started and operated, the motors giving good results in output, torque, and speed. Single-phase motors have been impracticable because, as already stated, they are not self-starting and cannot ordinarily be made so except at very considerable loss of efficiency and by the use of auxiliary devices, which are in many cases clumsy and impracticable.

The arrangement illustrated in Fig. 3 we believe to have special advantages in accomplishing the ends just pointed out, in that the parts are, as indicated by the same reference-letters, substantially like those of the other figures, $a\ b$ representing the trolley-line and the ground-return. The car is shown in dotted lines for clearness of illustration, and is provided with an ordinary trolley. In this case the switches S S' would be, in the operation of the vehicle, closed until the start had been effected, and could then be opened and the motors run directly between the two lines. They are shown connected in multiple; but no particular form of connection is imperative, and any desirable form of controlling apparatus may be employed. An alternative means of furnishing the starting effect necessary in electric railways is also illustrated in this figure, and consists of a small induction-motor, which, as it is designed to run idle, may be adapted for high speed. This is illustrated diagrammatically at $M^2$. This motor may be started in any convenient way, and may, if desired, be started before the car leaves the car-house, and the current is then left on, so that the motor constantly runs and furnishes for the main driving-motors M M' the out-of-phase electromotive force necessary to start it.

We believe that the theory of our invention may be briefly stated in ordinary language, as follows: In the three-phase induction-motors employed as illustrations an ordinary field-magnet winding is used and the armature of the motor has a regular three-phase or other suitable winding, which cuts the flux induced by the single-phase current in the field, each phase of the armature generating a certain counter electromotive force. The reaction between the armature electromotive force and the impressed single-phase electromotive force displaces the electromotive forces at the terminals of the field-winding from one another, and consequently the tendency of the motor is to displace or split the electromotive force impressed upon it. If the motor be supplied with single-phase current from one transformer only, there is no possibility of splitting the single-phase in this way, as all the coils are threaded by the same flux; but by employing transformers connected in the way described in our invention, one being reversed relatively to the other, the counter electromotive forces of the motor change the voltages at the terminals of the transformer by reflection, and this impresses on the motor itself electromotive forces of different phase relations, tending to increase its output. As an example, without attempting to state accurately the ratios, we may say that when the armature is standing still the potentials between the terminals G H I would be as follows: G H, one hundred volts; I G, one hundred volts; H I, zero. As the motor runs up to speed the voltage between H I becomes larger and larger, and at full load becomes practically equal to the other voltages, giving a condition substantially like the three-phase or quarter-phase systems. This displaced voltage, however, existing only when the motor is running, it cannot be used to start it, and the starting devices which we have illustrated and described, or some other means of supplying displaced electromotive forces to the motor, become necessary.

Nothing in our invention limits us to the use of induction-motors, as it will be manifest that similar effects and advantages may be obtained by the use of multiphase synchronous motors. We have therefore illustrated in Fig. 2 both an induction-motor and a synchronous motor $M^3$ running upon the same circuit. The same advantages of this construction as in the case of the railway-car may be realized in an installation comprising a number of motors, where ordinarily the starting appliance of our invention would be used at the beginning of the day's labor or after the noon hour, and as soon as one or more of the motors has been brought up approximately to speed it would be cut out, reliance being had for the starting of other motors upon those already operating and upon the fact of one or more motors being always in operation in every large establishment.

In the claims appended hereto we have spoken of a connection from the junction of the reactance and resistance to the motors. It is manifest that this connection may be direct, as in Fig. 3, where the reactance and resistance are in the secondary lines, or it may be indirect or inductive, as in Fig. 2, where they are included in the primaries, and the starting effect will be equally efficient.

What we claim as new, and desire to secure by Letters Patent of the United States, is—

1. In combination, lines between which single-phase electromotive force is maintained, transformers having their primaries connected in series between such lines and having a secondary in reversed relation to the remaining secondaries of the transformers, lines leading from the secondaries, and a multiphase motor connected to such lines.

2. In combination, lines between which single-phase electromotive force is maintained, a pair of transformers having their primaries connected in series between the mains, and their secondaries in reversed relation to one another, lines leading from the terminals of the secondaries and their junction, and a three-phase motor connected between such lines.

3. In combination, lines between which single-phase electromotive force is maintained, transformers connected in series across such lines and having their secondaries in reversed relation to each other, a reactance and resistance connected between the lines, lines leading from the secondaries to a motor or motors, and a connection between the junction of the reactance and resistance and the motor.

4. In combination, a single-phase electric railway comprising outgoing and return conductors, a traveling vehicle making contact with such conductors, transformers upon the vehicle having their primaries connected in series and their secondaries in reversed relation to one another, and polyphase motors taking current from the transformers.

5. A single-phase electric railway comprising outgoing and return conductors, a vehicle making traveling contact therewith, transformers carried upon the vehicle and having their primaries connected in series between the conductors, and their secondaries in reversed relation, polyphase electric motors taking current from such secondaries, and means for splitting the phase supplied to the motors.

6. A single-phase electric railway comprising outgoing and return conductors, a vehicle making traveling contact therewith, transformers having their primaries in series between the conductors, and their secondaries in reversed relation to each other, a reactance and resistance connected between the lines, and a connection from the junction of the reactance and resistance to the motors.

In witness whereof we have hereunto set our hands this 19th day of December, 1895.

CHARLES P. STEINMETZ.
ERNST J. BERG.

Witnesses:
B. B. HULL,
GENEVIEVE HAYNES.